United States Patent [19]
Zierhut

[11] Patent Number: 5,621,344
[45] Date of Patent: Apr. 15, 1997

[54] CIRCUIT ARRANGEMENT FOR COUPLING A FIRST ELECTRIC SIGNAL INTO A SECOND ELECTRIC SIGNAL

[75] Inventor: Hermann Zierhut, München, Germany

[73] Assignee: Siemens Aktiengesellschaft, München, Germany

[21] Appl. No.: 802,089

[22] Filed: Dec. 3, 1991

[30] Foreign Application Priority Data

May 12, 1990 [EP] European Pat. Off. ............ 90123324

[51] Int. Cl.⁶ .................. H03K 3/00; G05F 1/10; H04M 11/04
[52] U.S. Cl. .................. 327/181; 327/544; 327/594; 340/310.01; 340/310.07
[58] Field of Search ............ 307/280, 282, 307/300, 261, 246; 328/27; 327/181, 538, 544, 594; 340/310.01, 310.07

[56] References Cited

U.S. PATENT DOCUMENTS

| | | | |
|---|---|---|---|
| 4,461,966 | 7/1984 | Hebenstreit | 307/282 |
| 4,609,831 | 9/1986 | Higashino et al. | 307/282 |
| 5,019,955 | 5/1991 | Hoeksma | 307/280 |
| 5,023,471 | 6/1991 | Pauly | 307/282 |
| 5,081,440 | 1/1992 | Oh et al. | 340/310 A |

*Primary Examiner*—David C. Nelms
*Assistant Examiner*—Trong Phan
*Attorney, Agent, or Firm*—Kenyon & Kenyon

[57] ABSTRACT

In a circuit arrangement for coupling a first signal into a second electric signal formed as an alternating signal, a device is provided for compensating for effects of the coupling on the signal pattern of the second signal, particularly on the "pulse tilt" of the second signal. In a preferred variant of the circuit arrangement, the coupling is inductive, whereby the compensation device comprises a capacitively functioning element. The circuit arrangement is particularly suited for coupling a direct-voltage signal into an alternating-signal bus.

3 Claims, 2 Drawing Sheets

CIRCUIT ARRANGEMENT FOR COUPLING A FIRST ELECTRIC SIGNAL INTO A SECOND ELECTRIC SIGNAL

BACKGROUND OF THE INVENTION

The present invention relates to a circuit arrangement for coupling a first electric signal into a second signal formed as an alternating signal.

In data bus systems, it is generally known to carry both a data signal as well as a supply voltage on a bus conductor. EP-A 0 365 696 discloses such a system. A voltage supply supplies the bus conductor with a direct voltage which is symmetrical to ground. Several subscribers are linked to the bus conductor and tap off the supply voltage from the bus conductor and, further, receive a data signal from the bus conductor and transmit data on this conductor. The data signal is formed as an alternating signal with a square-wave pulse. The subscribers on the bus cause the signal pattern of this signal to change. It can happen that the data signal is changed to such an extent that the signal recognition processes no longer function properly.

SUMMARY OF THE INVENTION

The present invention seeks to solve this problem of changing signal patterns to eliminate the above-described disadvantages and thus seeks improve the data communication on the bus.

Starting from the fact that the bus subscribers are linked via coupling elements to the bus conductor, the inventor realized that the action of the coupling elements is an important factor in the changing of the alternating signal.

According to the present invention a circuit arrangement couples a first electric signal into a second electric signal using a device to compensate for the effects of coupling on the signal pattern of the second electric signal. In particular, the device compensates for the pulse tilt of the second electric signal. In this manner, the signal pattern of the ac voltage, in particular the edges and the pulse tilt, is nearly retained. The signal recognition is thus improved.

The coupling of the signals may be done inductively with the compensation device including a capacitively functioning element. The capacitive element may be coupled to the inductive coupling element.

Furthermore, the second signal may include a first pulse part, a rising pulse, and a second pulse part, a falling or kick-back pulse. The capacitive element can be charged during that first pulse part and discharged during the second pulse part. These designs are favorable when the influences that alter the signal pattern are of an inductive type. The circuit arrangement can be applied to any subscribers of a data bus system.

The application of the present invention is particularly advantageous when the first pulse part of the alternating signal is actively formed, particularly as a rising pulse, by a transmitter, and the second pulse part, for example the falling pulse, is formed by the bus subscribers as a kick-back pulse.

The inductive element can include one winding coupling the signals and another winding coupled to the capacitive element. In this configuration the other winding, a capacitor and a diode form a charging series circuit while a discharge circuit is connected in parallel with the capacitor. This circuit is particularly simple in its construction and comprises only a few component parts.

BRIEF DESCRIPTION OF THE DRAWINGS

Exemplified embodiments of the invention shall be clarified in greater detail in the following description with reference to the drawings.

DETAILED DESCRIPTION OF THE PREFERRED EMBODIMENTS

Figure 1:
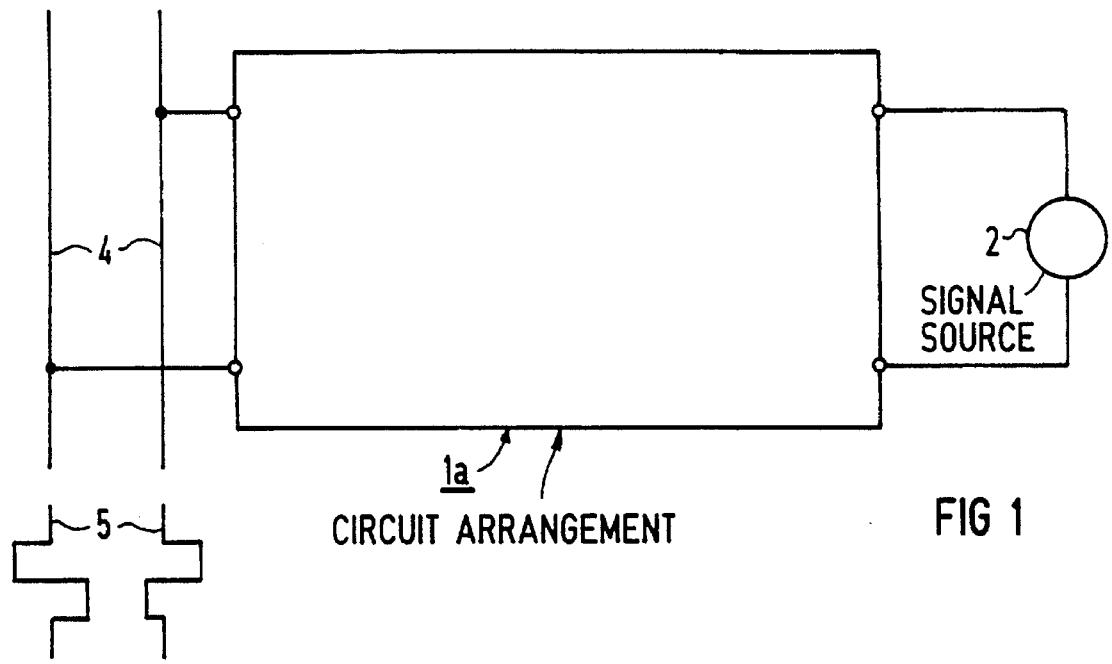
FIG. 1 illustrates a circuit arrangement.

FIG. 1 shows a circuit arrangement 1a, in which a signal source 2 for a first electric signal is coupled via the circuit arrangement 1a to the bus conductors 4. The bus conductors 4 thereby carry a second electric signal 5 developed as an alternating signal. The second signal 5 is preferably developed thereby as a square-wave signal. The subscribers connected to the bus conductors 4, particularly also the coupling of the signal source 2, cause the second signal 5 to be affected in a way which changes the signal pattern, in particular the peak level and the edges. Circuit arrangement 1a is designed to compensate for the effects that cause the signal pattern to change. For this, the circuit arrangement 1a comprises elements which counteract the effects.

The second signal 5 is not depicted further in the following FIGS. 2 through 5. It approximates that for FIG. 1.

Figure 2:
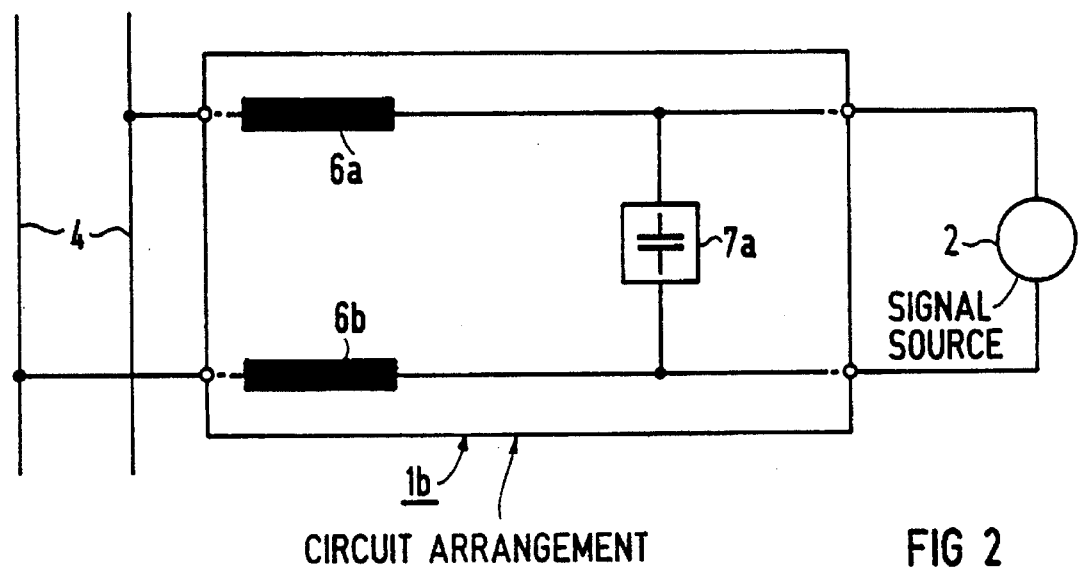
FIG. 2 illustrates a circuit arrangement with a capacitive element in accordance with an embodiment of the present invention.

FIG. 2 shows a circuit arrangement 1b, in which the signal source 2 is coupled to the bus conductor 4 via inductors 6a and 6b. The inductors 6a, 6b are component parts of the device 3. Since the altering influence on the second signal 5 is essentially of inductive origin, the circuit arrangement 1b has a capacitively functioning element 7a. This capacitive element compensates for the inductive effect of the inductors 6a, 6b on the second signal 5. This measure concerns in particular the top, or rather the pulse tilts of the first pulse part in the signal pattern.

Figure 3:
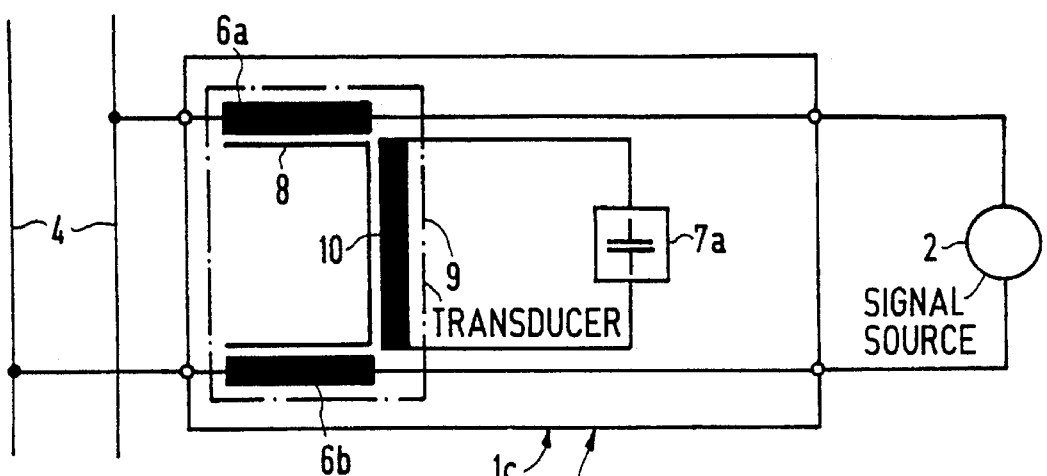
FIG. 3 illustrates another embodiment of circuit arrangement according to FIG. 2.

FIG. 3 depicts another embodiment of the circuit arrangement of the present invention, and is a modification of the circuit of FIG. 2. In this circuit arrangement 1c, the inductors 6a, 6b exhibit a common core 8. The coupling of the voltage source 2 is therefore inductive, as in FIG. 2, whereby the inductive coupling, particularly the inductors 6a, 6b, are two windings of an inductive transducer 9. The capacitive element 7a is coupled to another winding 10 of the inductive transducer. In this manner, the compensation is galvanically separated from the bus conductors 4 and is completely symmetrical.

Figure 4:
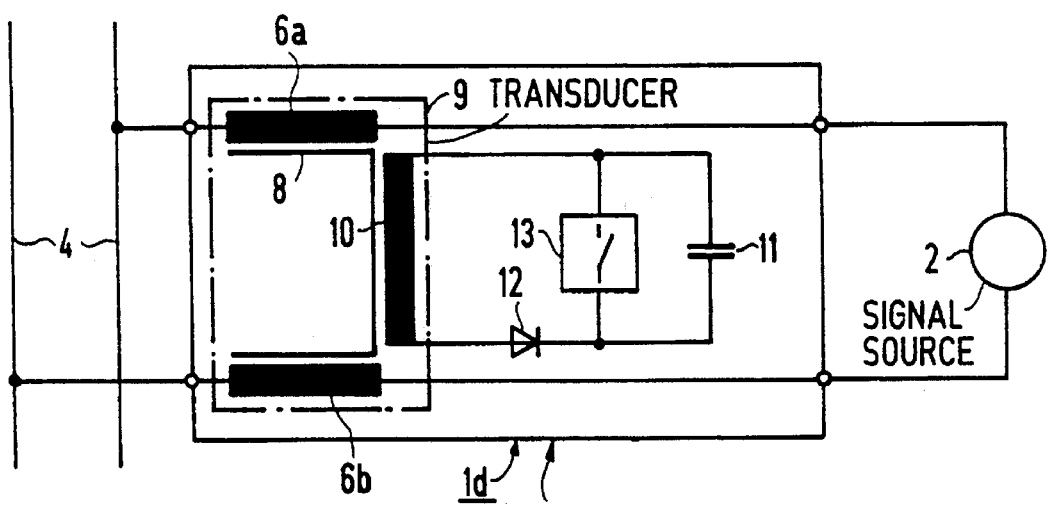
FIG. 4 illustrates a modification of the circuit arrangement according to FIG. 3.

FIG. 4 depicts yet another circuit arrangement, 1e, in which the capacitive element of FIG. 3 is modified. The winding 10, together with a capacitor 11 and a diode 12, thereby form a charging series circuit. A discharge circuit 13 is connected in parallel with the capacitor 11. In this manner, it is possible for the compensation by means of the capacitor 11 to follow at specified times, particularly during the rising pulse of the second signal 5, and for its discharge to be guaranteed, particularly during the falling pulse or the kick-back pulse of that second signal.

Figure 5:
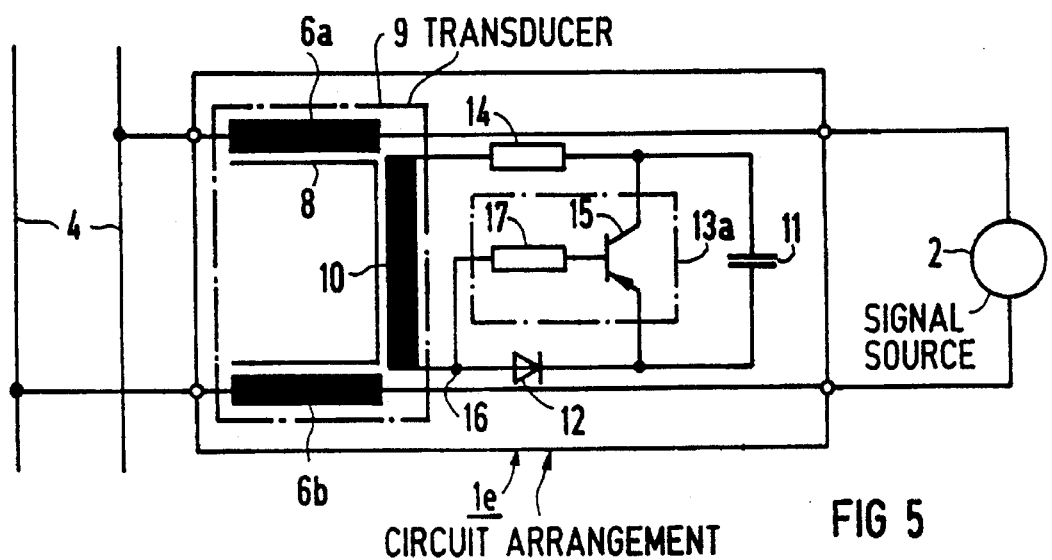
FIG. 5 illustrates a modification of the circuit arrangement according to FIG. 4.

FIG. 5 depicts another embodiment of the present invention. As in FIG. 4 with the capacitor 11 and the diode 12, the other winding 10 of the transducer 9 thereby constitutes a charging series circuit for compensating for inductive influences on the second signal 5. A series resistor 14 can be optionally connected thereby in the charging series circuit. The discharge circuit 13a contains a controllable semiconductor, which is presently designed as a transistor 15. The emitter-collector section of the transistor 15 is connected in parallel with the capacitor 11. Via a tap 16 of the charging series circuit, the base of the transistor 15, which serves as a control input, receives a control signal in the sense of a discharge control for the capacitor 11. In addition, a resistor 17 can also be connected between the tap 16 and the base of the transistor 15.

The semiconductor shown as an example, namely the PNP-transistor 15, can be replaced as needed by a semiconductor with an equivalent function, in particular by an NPN transistor, a field-effect transistor or a controllable semiconductor valve.

The signal source 2 in FIGS. 1 through 5 is preferably developed as a direct-voltage source, whereby the second signal 5 is essentially a square-wave alternating signal. Since the signal source 2 effectively serves as a current supply for the bus subscribers, the second signal 5 can be generated in dependence upon the first signal.

The embodiments of the circuit arrangements 1a through 1e in FIGS. 1 through 5 also apply analogously of course to capacitive influences on the bus signal, which are compensated for by means of a compensation with an inductively functioning element. The circuit arrangement is preferably applicable to the coupling of a signal source into an alternating-signal bus.

What is claimed is:

1. A circuit arrangement for coupling a first electric signal to a second electric signal said second electric signal being an alternating signal, comprising a device compensating for pulse tilt effects of the circuit arrangement on the signal pattern of said second signal, wherein said compensating device includes a capacitive element and an inductive element, said inductive element coupling said first and second electric signals, whereby the inductive element comprises a first winding coupling said first and second signals and a second winding coupling said inductive element to said capacitive element, wherein said capacitive element includes a capacitor and a diode connected in series such that the second winding together with said diode and said capacitor form a charging series circuit, and further comprising a discharge circuit connected in parallel with said capacitor.

2. The circuit arrangement according to claim 1, wherein said discharge circuit comprises a controllable semiconductor device having a controllable section, said controllable section being connected in parallel with said capacitor, and having a control input, said control input receiving a control signal, said control signal being based on a discharge control for the capacitor.

3. The circuit arrangement according to claim 2, wherein the charging series circuit further includes a series resistor, and wherein the polarity of said diode is arranged such that said capacitor may be charged during a first pulse part of the second signal, and whereby said control input of the semiconductor leads via a resistor to the charging series circuit.

* * * * *